(12) United States Patent
Marui et al.

(10) Patent No.: US 9,639,025 B2
(45) Date of Patent: May 2, 2017

(54) SEMICONDUCTIVE ROLLER

(71) Applicant: SUMITOMO RUBBER INDUSTRIES, LTD., Kobe-shi, Hyogo (JP)

(72) Inventors: Takashi Marui, Kobe (JP); Kei Tajima, Kobe (JP); Yoshihisa Mizumoto, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 118 days.

(21) Appl. No.: 14/842,395

(22) Filed: Sep. 1, 2015

(65) Prior Publication Data

US 2016/0077462 A1 Mar. 17, 2016

(30) Foreign Application Priority Data

Sep. 16, 2014 (JP) ................................. 2014-187914

(51) Int. Cl.
| | |
|---|---|
| *G03G 15/08* | (2006.01) |
| *G03G 15/00* | (2006.01) |
| *C08L 19/00* | (2006.01) |
| *B65H 27/00* | (2006.01) |

(52) U.S. Cl.
CPC ......... *G03G 15/0818* (2013.01); *B65H 27/00* (2013.01); *C08L 19/006* (2013.01); *G03G 15/6511* (2013.01); *G03G 15/6529* (2013.01); *G03G 15/6552* (2013.01)

(58) Field of Classification Search
CPC ........ C08L 19/00; C08L 19/006; C08L 23/16; C08L 23/18; C08L 23/20; C08L 23/22; C08L 23/24; G03G 15/6511; G03G 15/6529; G03G 15/6552; G03G 2215/00683; B65H 27/00; B65H 2401/113
USPC ........................................ 492/56, 59
See application file for complete search history.

(56) References Cited

U.S. PATENT DOCUMENTS

| | | | | |
|---|---|---|---|---|
| 4,197,386 A | * | 4/1980 | Schoen ..................... | C08F 8/22 525/356 |
| 5,597,652 A | * | 1/1997 | Utsunomiya ...... | G03G 15/0233 428/340 |
| 5,693,714 A | * | 12/1997 | Bauman .................. | C08C 19/12 521/54 |
| 5,872,190 A | * | 2/1999 | Gutowski ................. | C08F 8/20 204/157.62 |
| 6,741,821 B2 | * | 5/2004 | Sugino ............... | G03G 15/0194 399/111 |

(Continued)

FOREIGN PATENT DOCUMENTS

| | | |
|---|---|---|
| JP | 2013-61614 A | 4/2013 |
| JP | 2013-83728 A | 5/2013 |
| JP | 5419958 B2 | 2/2014 |

*Primary Examiner* — Jason L Vaughan
(74) *Attorney, Agent, or Firm* — Birch, Stewart, Kolasch & Birch, LLP

(57) ABSTRACT

A semiconductive roller for use as a developing roller or the like is provided, which has an outer peripheral surface at least partly imparted with a reduced friction coefficient μ without irradiation with ultraviolet radiation. The semiconductive roller (1) includes a tubular body made of a crosslinking product of an electrically conductive rubber composition containing a crosslinkable rubber component, and a chloride film (5) formed in the outer peripheral surface (4) thereof through chlorination.

1 Claim, 1 Drawing Sheet

(56) References Cited

U.S. PATENT DOCUMENTS

| | | | | |
|---|---|---|---|---|
| 7,172,544 B2* | 2/2007 | Ki | ............... | G03G 15/0233 |
| | | | | 492/53 |
| 7,448,610 B2* | 11/2008 | Ito | ............... | B65H 3/0638 |
| | | | | 271/109 |
| 7,728,060 B2* | 6/2010 | Minagoshi | ............... | C08L 23/0869 |
| | | | | 399/176 |
| 7,729,642 B2* | 6/2010 | Matsumoto | ............... | G03G 15/0879 |
| | | | | 399/255 |
| 7,817,942 B2* | 10/2010 | Deguchi | ............... | G03G 15/10 |
| | | | | 399/241 |
| 8,244,145 B2* | 8/2012 | Yamaguchi | ............... | G03G 15/0806 |
| | | | | 399/31 |
| 8,265,525 B2* | 9/2012 | Wada | ............... | G03G 15/0233 |
| | | | | 399/176 |
| 8,431,679 B2* | 4/2013 | Aizawa | ............... | C08J 7/047 |
| | | | | 524/502 |
| 8,494,429 B2* | 7/2013 | Seo | ............... | G03G 21/0029 |
| | | | | 399/123 |
| 8,652,624 B2* | 2/2014 | Subramanian | ............... | B32B 27/32 |
| | | | | 428/213 |
| 9,046,803 B2* | 6/2015 | Hoshio | ............... | G03G 15/0216 |
| 2002/0074696 A1* | 6/2002 | Wu | ............... | C08F 8/32 |
| | | | | 264/446 |
| 2004/0077793 A1* | 4/2004 | Dees | ............... | C08L 23/16 |
| | | | | 525/240 |
| 2007/0044906 A1* | 3/2007 | Park | ............... | B29C 47/0023 |
| | | | | 156/272.2 |
| 2007/0225425 A1* | 9/2007 | Nash | ............... | C08C 19/12 |
| | | | | 524/500 |
| 2013/0051870 A1 | 2/2013 | Kuroda et al. | | |
| 2013/0089362 A1 | 4/2013 | Kuroda et al. | | |
| 2013/0281276 A1* | 10/2013 | Watanabe | ............... | G03G 15/751 |
| | | | | 492/18 |

* cited by examiner

SEMICONDUCTIVE ROLLER

TECHNICAL FIELD

The present invention relates to a semiconductive roller and, particularly, to a semiconductive roller to be used as a developing roller or the like in an electrophotographic image forming apparatus.

BACKGROUND ART

In an electrophotographic image forming apparatus such as a laser printer, an electrostatic copying machine, a plain paper facsimile machine or a printer-copier-facsimile multifunction machine, an electrostatic latent image formed on a surface of a photoreceptor body by electrically charging the photoreceptor surface and exposing the photoreceptor surface to light is developed into a toner image with a toner, and a developing roller is used for the development.

In order to suppress adhesion of the toner for prevention of reduction in image density, the friction on an outer peripheral surface of the developing roller is desirably reduced. For this purpose, an oxide film is generally formed in the outer peripheral surface by irradiating the outer peripheral surface with ultraviolet radiation as described, for example, in Patent Document 1.

CITATION LIST

Patent Document

Patent Document 1: JP2013-61614A

SUMMARY OF THE INVENTION

Problem to be Solved by the Invention

However, an expensive ultraviolet lamp is required for the irradiation with the ultraviolet radiation. In addition, the ultraviolet lamp has a short service life, requiring frequent replacement. This increases the costs required for the oxide film formation step, or reduces the working efficiency in the oxide film formation step with the need for cumbersome lamp replacement.

If the ultraviolet lamp is continuously used, the ultraviolet lamp is gradually degraded. Therefore, the radiation intensity is liable to decrease with time after the start of the use of the ultraviolet lamp.

In order to constantly form an oxide film having predetermined physical properties and a predetermined thickness, it is necessary to measure the radiation intensity and adjust an irradiation period, an irradiation distance and the like based on the measurement results whenever the aforementioned step is performed. Problematically, substantial amounts of time and efforts are required for setting these conditions, thereby reducing the working efficiency in the aforementioned step.

It is an object of the present invention to provide a semiconductive roller having an outer peripheral surface imparted with a reduced friction coefficient μ without the irradiation with the ultraviolet radiation for use as a developing roller or the like.

Solution to Problem

The present invention provides a semiconductive roller which includes a tubular body made of a crosslinking product of an electrically conductive rubber composition containing a crosslinkable rubber component, and having a chlorinated outer peripheral surface.

Effects of the Invention

According to the present invention, the outer peripheral surface of the semiconductive roller (e.g., developing roller) is chlorinated, whereby a chloride film is formed in the outer peripheral surface. Thus, the friction coefficient μ of the outer peripheral surface is reduced.

According to the present invention, therefore, the semiconductive roller (e.g., developing roller) can be provided, which has an outer peripheral surface imparted with a reduced friction coefficient μ without the irradiation with the ultraviolet radiation.

EMBODIMENTS OF THE INVENTION

A semiconductive roller according to the present invention includes a tubular body made of a crosslinking product of an electrically conductive rubber composition containing a crosslinkable rubber component, and having a chlorinated outer peripheral surface.

According to the present invention, the outer peripheral surface is chlorinated as described above, whereby the friction coefficient μ of the outer peripheral surface is significantly reduced. That is, a part of the rubber component present in the outer peripheral surface is chlorinated. More specifically, chlorine reacts with double bonds in the rubber component, whereby the micro-hardness of the outer peripheral surface is significantly increased. Thus, the friction coefficient μ is reduced as compared with an unchlorinated softer outer peripheral surface.

In addition, the chlorination is achieved simply by bringing chlorine water, chlorine gas or the like into contact with the outer peripheral surface. Further, the physical properties and the thickness of the chloride film can be controlled by controlling the chlorine concentration of the chlorine water or the chlorine gas as well as other chlorination conditions such as the chlorination temperature and the chlorination period.

Therefore, the reduction of the friction coefficient μ of the outer peripheral surface can be easily and efficiently achieved at lower costs without the irradiation with the ultraviolet radiation which may otherwise cause the aforementioned various problems, thereby suppressing the adhesion of the toner and the reduction in image density. Opposite end portions of the outer peripheral surface to be brought into sliding contact with a seal member may be further chlorinated for further reduction of the friction coefficient μ. This prevents abrasion of the opposite end portions and leakage of toner which may otherwise occur due to the abrasion.

Figure 1:
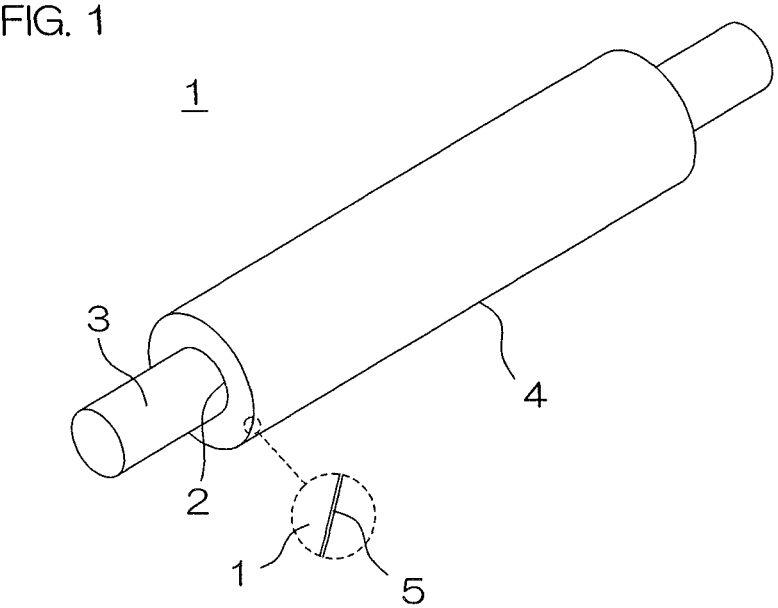
FIG. 1 is a perspective view illustrating an exemplary semiconductive roller according to one embodiment of the present invention.

FIG. 1 is a perspective view illustrating an exemplary semiconductive roller according to one embodiment of the present invention.

Referring to FIG. 1, the semiconductive roller 1 according to this embodiment includes the tubular body made of the crosslinking product of the electrically conductive rubber composition containing the crosslinkable rubber component, and a shaft 3 is inserted through and fixed to a center through-hole 2 of the tubular body.

The shaft 3 is made of a metal such as aluminum, an aluminum alloy or a stainless steel.

The shaft 3 is electrically connected to and mechanically fixed to the semiconductive roller 1, for example, via an electrically conductive adhesive agent. Alternatively, a shaft having an outer diameter that is greater than the inner diameter of the through-hole 2 is used as the shaft 3, and press-inserted into the through-hole 2 to be electrically connected to and mechanically fixed to the semiconductive roller 1. Thus, the shaft 3 and the semiconductive roller 1 are unitarily rotatable.

<Chlorination>

The chloride film 5 is formed in the outer peripheral surface 4 of the semiconductive roller 1 through the chlorination by bringing the chlorine water, the chlorine gas or the like into contact with the outer peripheral surface 4, as described above, whereby the friction coefficient μ of the outer peripheral surface 4 is reduced.

Where the chlorine water is used for the chlorination, the chlorine water is preferably prepared, for example, by blowing chlorine gas in water or by adding hydrochloric acid (having a concentration of 35%) and sodium hypochlorite to water.

In the latter case, the chlorine water is prepared by generating chlorine based on the following formula:

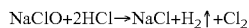

$$NaClO + 2HCl \rightarrow NaCl + H_2\uparrow + Cl_2$$

Where the liquid temperature of the chlorine water is about 10° C. to about 40° C. and the contact period is about 2 to about 20 minutes, not less than 1 g and not greater than 20 g of hydrochloric acid and not less than 2 g and not greater than 40 g of sodium hypochlorite are preferably added to 500 g of water for preparation of the chlorine water. The blending ratio between the hydrochloric acid and the sodium hypochlorite is approximately (hydrochloric acid): (sodium hypochlorite)=1:2.

If the amounts of the hydrochloric acid and the sodium hypochlorite to be added are less than the aforementioned ranges, it will be impossible to sufficiently reduce the friction coefficient μ because the chloride film 5 cannot be formed as having a sufficient thickness in the outer peripheral surface 4 due to an insufficient chlorine amount.

If the amounts of the hydrochloric acid and the sodium hypochlorite to be added are greater than the aforementioned ranges, on the other hand, cracks are liable to occur in the outer peripheral surface 4 due to excessive chlorination.

Where the amounts of the hydrochloric acid and the sodium hypochlorite respectively fall within the aforementioned ranges, the chloride film 5 can be formed in the outer peripheral surface 4 without cracking the outer peripheral surface 4, thereby sufficiently reducing the friction coefficient μ of the outer peripheral surface 4.

Where the chlorine gas is used for the chlorination, the chlorination may be carried out by setting the semiconductive roller 1 in a sealed chamber, evacuating the chamber, purging the chamber with an inert gas, feeding the chlorine gas or a mixture gas of the chlorine gas and the inert gas, keeping the outer peripheral surface 4 in contact with the gas for a predetermined period.

Alternatively, the chlorination may be carried out by a plasma chlorination method using the aforementioned gas or a gaseous chlorine-containing compound.

<Friction Coefficient μ>

The friction coefficient μ of the outer peripheral surface 4 may be lower than that observed before the chlorination, but is preferably not greater than 0.20, particularly preferably not greater than 0.15.

If the friction coefficient μ is greater than the aforementioned range, the friction reducing effect by the chlorination is insufficient, making it impossible to suppress the adhesion of the toner and the reduction in image density.

The friction coefficient μ is preferably as small as possible in the aforementioned range. However, this requires a longer period of time for the chlorination to thereby reduce the productivity of the semiconductive roller 1, or requires higher-concentration chlorine water to result in cracking of the outer peripheral surface 4. Therefore, the friction coefficient μ is preferably not less than 0.05.

<Measurement of Friction Coefficient μ>

In the present invention, the friction coefficient μ of the outer peripheral surface 4 is determined at a temperature of 23±1° C. at a relative humidity of 55±1% by the following method.

Figure 2:
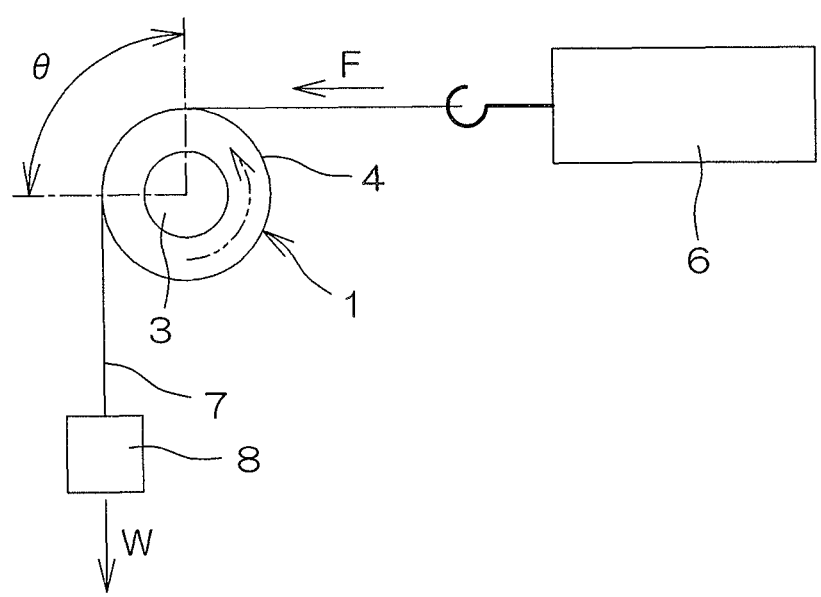
FIG. 2 is a diagram for explaining how to measure the friction coefficient μ of an outer peripheral surface of the semiconductive roller.

Referring to FIGS. 1 and 2, the semiconductive roller 1 to be subjected to the measurement of the friction coefficient μ is held so as to be rotatable in a direction indicated by a two-dot-and-dash line (see FIG. 2) with a center axis of the shaft 3 kept horizontal. Further, a load meter 6 is provided as spaced a predetermined distance from the center axis of the semiconductive roller 1.

Then, an OHP film 7 is prepared, and brought into contact with the outer peripheral surface 4 of the semiconductive roller 1 with a weight 8 (having a mass W of 20 g) attached to one of opposite ends thereof and with the other end thereof connected to the load meter 6.

At this time, a part of the OHP film 7 present between the semiconductive roller 1 and the load meter 6 is kept horizontal, while a part of the OHP film 7 present between the semiconductive roller 1 and the weight 8 is suspended vertically. Thus, the other part of the OHP film 7 having a contact angle θ of 90 degrees about the center axis of the shaft 3 is kept in contact with the outer peripheral surface 4 of the semiconductive roller 1.

In this state, a load F (g) occurring when the semiconductive roller 1 is rotated at a predetermined speed in the direction indicated by the two-dot-and-dash line is measured by means of the load meter 6, and the friction coefficient μ is calculated based on the measured load F (g), the mass W (g) of the weight 8 and the contact angle θ (degrees) from the following expression (i):

$$\mu = (1/\theta)\ln(F/W) \qquad (i)$$

<Electrically Conductive Rubber Composition>

Usable as the electrically conductive rubber composition for the inventive semiconductive roller 1 are various electrically conductive rubber compositions which contain at least a crosslinkable rubber component and are electron-conductive or ion-conductive so as to impart the semiconductive roller with proper electrical conductivity.

In order to reduce the environmental dependence of the roller resistance of the semiconductive roller 1 and reduce the production costs of the semiconductive roller 1, the electrically conductive rubber composition is particularly preferably imparted with electron conductivity by blending an electron conductive agent such as carbon black or graphite with the crosslinkable rubber component.

(Rubber Component)

The rubber component for the electrically conductive rubber composition includes, for example, at least one selected from the group consisting of a styrene butadiene rubber (SBR), an acrylonitrile butadiene rubber (NBR), a butadiene rubber (BR) and an acrylic rubber.

An ethylene propylene diene rubber (EPDM) may be further blended in the rubber component. The blending of the EPDM suppresses the cracking of the outer peripheral surface 4 during the chlorination.

(SBR)

Usable as the SBR are various SBRs synthesized by copolymerizing styrene and 1,3-butadiene by an emulsion polymerization method, a solution polymerization method and other various polymerization methods.

According to the styrene content, the SBRs are classified into a higher styrene content type, an intermediate styrene content type and a lower styrene content type, and any of these types of SBRs is usable.

The SBRs include those of an oil-extension type having flexibility controlled by addition of an extension oil, and those of a non-oil-extension type containing no extension oil. Particularly, where the semiconductive roller 1 is used as the developing roller or the like, an SBR of the non-oil-extension type is preferably used for prevention of contamination of the photoreceptor body.

These SBRs may be used either alone or in combination.

(NBR)

The NBR is classified in a lower acrylonitrile content type, an intermediate acrylonitrile content type, an intermediate to higher acrylonitrile content type, a higher acrylonitrile content type or a very high acrylonitrile content type depending on the acrylonitrile content. Any of these types of NBRs is usable.

The NBRs include those of an oil-extension type having flexibility controlled by addition of an extension oil, and those of a non-oil-extension type containing no extension oil. Where the semiconductive roller 1 is used as the developing roller or the like, an NBR of the non-oil-extension type is preferably used for prevention of the contamination of the photoreceptor body.

These NBRs may be used either alone or in combination.

(BR)

Usable as the BR are various crosslinkable BRs.

Particularly, a higher cis-content BR having a cis-1,4 bond content of not less than 95% and having excellent lower-temperature characteristic properties and a lower hardness and hence a higher flexibility in the lower temperature and lower humidity environment is preferred.

The BRs include those of an oil-extension type having flexibility controlled by addition of an extension oil, and those of a non-oil-extension type containing no extension oil. Where the semiconductive roller 1 is used as the developing roller or the like, a BR of the non-oil-extension type is preferably used for prevention of the contamination of the photoreceptor body.

These BRs may be used either alone or in combination.

(Acrylic Rubber)

Usable as the acrylic rubber are various acrylic rubbers containing an alkyl acrylate as a major monomer component and non-crosslinkable by sulfur.

Examples of the acrylic rubber include acrylic rubbers each synthesized by copolymerizing an alkyl acrylate such as ethyl acrylate or butyl acrylate with a halogen-containing compound such as 2-chloroethyl vinyl ether, or butadiene, acrylonitrile, glycidyl acrylate, allyl glycidyl ether or ethylidene norbornene, and non-crosslinkable by sulfur. These acrylic rubbers may be used either alone or in combination.

(EPDM)

Usable as the EPDM are various EPDMs each prepared by introducing double bonds into a main chain thereof by employing a small amount of a third ingredient (diene) in addition to ethylene and propylene. A variety of EPDM products containing different types of third ingredients in different amounts are commercially available. Typical examples of the third ingredients include ethylidene norbornene (ENB), 1,4-hexadiene (1,4-HD) and dicyclopentadiene (DCP).

The EPDMs include those of an oil-extension type having flexibility controlled by addition of an extension oil, and those of a non-oil-extension type containing no extension oil. Where the semiconductive roller 1 is used as the developing roller or the like, an EPDM of the non-oil-extension type is preferably used for prevention of the contamination of the photoreceptor body.

These EPDMs may be used either alone or in combination.

(Blending Proportions)

The proportion of the EPDM to be blended is preferably not less than 30 parts by mass and not greater than 70 parts by mass based on 100 parts by mass of the overall rubber component.

If the proportion of the EPDM is less than the aforementioned range, it will be impossible to sufficiently provide the effect of suppressing the cracking of the outer peripheral surface 4 during the aforementioned chlorination by the blending of the EPDM. Therefore, the outer peripheral surface 4 is liable to suffer from the cracking.

If the proportion of the EPDM is greater than the aforementioned range, on the other hand, it will be impossible to sufficiently reduce the friction coefficient $\mu$ of the outer peripheral surface 4 by the chlorination, because the EPDM is highly chemical-resistant and hence less susceptible to the chlorination.

Where the proportion of the EPDM falls within the aforementioned range, in contrast, it is possible to sufficiently reduce the friction coefficient $\mu$ of the outer peripheral surface 4 while suppressing the cracking of the outer peripheral surface 4.

The proportions of the other rubbers for the rubber component may be properly determined.

Where the EPDM is used in combination with another type of rubber for the rubber component, for example, the proportion of another rubber is a balance obtained by subtracting the proportion of the EPDM from the total. That is, the proportion of another rubber is preferably not less than 30 parts by mass and not greater than 70 parts by mass, based on 100 parts by mass of the overall rubber component.

Where two other types of rubbers, e.g., the SBR and the NBR, are used in combination with the EPDM for the rubber component, the sum of the proportions of the SBR and the NBR is a balance obtained by subtracting the proportion of the EPDM from the total. That is, the sum of the proportions of the two other rubbers is preferably not less than 30 parts by mass and not greater than 70 parts by mass, based on 100 parts by mass of the overall rubber component.

The mass ratio between the SBR and the NBR is preferably SBR/NBR=40/60 to 60/40.

<Electron Conductive Agent>

Examples of the electron conductive agent include: electrically-conductive carbon-containing agents such as electrically conductive carbon black, carbon, carbon fibers and graphite; fine metal particles such as of silver, copper and nickel; fine metal oxide particles such as of zinc oxide, tin oxide and titanium oxide; metal fibers and whiskers such as of aluminum and stainless steel; and glass beads and synthetic fibers coated with metals to be imparted with electrical conductivity. These electron conductive agents may be used either alone or in combination.

Particularly, electrically conductive carbon black is preferred. Specific examples of the electrically conductive carbon black include DENKA BLACK (registered trade name) available from Denki Kagaku Kogyo K.K., KETJEN BLACK (registered trade name) EC300J available from Lion Corporation, and HAF-, SAF- and ISAF-grade carbon blacks, which may be used either alone or in combination.

The proportion of the electrically conductive carbon black to be blended is preferably not less than 40 parts by mass and not greater than 55 parts by mass, particularly preferably not less than 45 parts by mass and not greater than 50 parts by mass, based on 100 parts by mass of the overall rubber component.

If the proportion of the electrically conductive carbon black is less than the aforementioned range, it will be impossible to impart the semiconductive roller 1 with proper semiconductivity.

If the proportion of the electrically conductive carbon black is greater than the aforementioned range, on the other hand, the semiconductive roller 1 is liable to become less flexible to have a higher hardness, thereby suffering from reduction in imaging durability and other problems. Further, an excess amount of the electrically conductive carbon black is liable to agglomerate in the electrically conductive rubber composition, failing to uniformly impart the semiconductive roller 1 with semiconductivity.

Where the proportion of the electrically conductive carbon black falls within the aforementioned range, in contrast, it is possible to impart the semiconductive roller 1 with proper flexibility as well as proper and uniform semiconductivity.

<Crosslinking Component>

The rubber composition includes a crosslinking component for crosslinking the rubber component. The crosslinking component includes a crosslinking agent, an accelerating agent and an acceleration assisting agent.

Examples of the crosslinking agent include a sulfur crosslinking agent, a thiourea crosslinking agent, a triazine derivative crosslinking agent, a peroxide crosslinking agent and monomers, which may be used either alone or in combination.

Examples of the sulfur crosslinking agent include sulfur such as sulfur powder and organic sulfur-containing compounds. Examples of the organic sulfur-containing compounds include tetramethylthiuram disulfide and N,N-dithiobismorpholine.

Examples of the thiourea crosslinking agent include tetramethylthiourea, trimethylthiourea, ethylene thiourea, and thioureas represented by $(C_nH_{2n+1}NH)_2C=S$ (wherein n is an integer of 1 to 10), which may be used either alone or in combination.

Examples of the peroxide crosslinking agent include benzoyl peroxide, 1,1-bis(tert-butylperoxy)-3,3,5-trimethylcyclohexane, 2,5-dimethyl-2,5-di(benzoylperoxy)hexane, di(tert-butylperoxy)diisopropylbenzene, 1,4-bis[(tert-butyl)peroxyisopropyl]benzene, di(tert-butylperoxy)benzoate, tert-butylperoxybenzoate, dicumyl peroxide, tert-butyl cumyl peroxide, 2,5-dimethyl-2,5-di(tert-butylperoxy)hexane, di-tert-butyl peroxide and 2,5-dimethyl-2,5-di(tert-butylperoxy)-3-hexene, which may be used either alone or in combination.

Where the rubber component includes the EPDM, the SBR, the NBR and/or the BR, the sulfur and the peroxide crosslinking agent are preferably used in combination as the crosslinking agent.

The proportion of the sulfur is preferably not less than 0.2 parts by mass and not greater than 3 parts by mass, particularly preferably not less than 0.5 parts by mass and not greater than 2 parts by mass, based on 100 parts by mass of the overall rubber component. The proportion of the peroxide crosslinking agent is preferably not less than 1 part by mass and not greater than 3 parts by mass, particularly preferably not less than 1.5 parts by mass and not greater than 2.5 parts by mass, based on 100 parts by mass of the overall rubber component.

Examples of the accelerating agent include inorganic accelerating agents such as lime, magnesia (MgO) and litharge (PbO), and organic accelerating agents, which may be used either alone or in combination.

Examples of the organic accelerating agents include: guanidine accelerating agents such as 1,3-di-o-tolylguanidine, 1,3-diphenylguanidine, 1-o-tolylbiguanide and a di-o-tolylguanidine salt of dicatechol borate; thiazole accelerating agents such as 2-mercaptobenzothiazole and di-2-benzothiazolyl disulfide; sulfenamide accelerating agents such as N-cyclohexyl-2-benzothiazylsulfenamide; thiuram accelerating agents such as tetramethylthiuram monosulfide, tetramethylthiuram disulfide, tetraethylthiuram disulfide, tetrabutylthiuram disulfide and dipentamethylenethiuram tetrasulfide; and thiourea accelerating agents, which may be used either alone or in combination.

Different types of accelerating agents have different functions and, therefore, are preferably used in combination.

The proportion of each of the accelerating agents to be blended may be properly determined depending on the type of the accelerating agent, but is typically not less than 0.1 part by mass and not greater than 5 parts by mass, particularly preferably not less than 0.2 parts by mass and not greater than 2 parts by mass, based on 100 parts by mass of the overall rubber component.

Examples of the acceleration assisting agent include: metal compounds such as zinc white; fatty acids such as stearic acid, oleic acid and cotton seed fatty acids; and other conventionally known acceleration assisting agents, which may be used either alone or in combination.

The proportion of each of the acceleration assisting agents to be blended is preferably not less than 0.1 part by mass and not greater than 7 parts by mass, particularly preferably not less than 0.5 parts by mass and not greater than 5 parts by mass, based on 100 parts by mass of the overall rubber component.

<Other Ingredients>

As required, various additives may be added to the electrically conductive rubber composition. Examples of the additives include a filler, an anti-aging agent, an antioxidant, an anti-scorching agent, a pigment, a flame retarder and a defoaming agent.

The electrically conductive rubber composition containing the aforementioned ingredients can be prepared in a conventional manner. While the rubber component is simply kneaded, additives other than the crosslinking component are added to the rubber component. After the resulting mixture is further kneaded, the crosslinking component is finally added to and further kneaded with the mixture. Thus, the electrically conductive rubber composition is prepared.

A kneader, a Banbury mixer, an extruder or the like, for example, is usable for the kneading.

For production of the inventive semiconductive roller with the use of the electrically conductive rubber composition, the electrically conductive rubber composition is first formed into a tubular body by means of an extruder, and the tubular body is cut to a predetermined length. Then, the rubber component of the resulting tubular body is vulcanized in a vulcanization can by pressure and heat.

The tubular body thus crosslinked is heated in an oven for secondary crosslinking, then cooled, and polished to a predetermined outer diameter.

Any of various polishing methods such as a dry traverse grinding method may be employed for the polishing. Where the outer peripheral surface 4 is mirror-polished at the end of the polishing step, the releasability of the outer peripheral surface 4 is improved. Thus, when the semiconductive roller is used as the developing roller or the like, for example, it is possible to suppress the adhesion of the toner and to effectively prevent the contamination of the photoreceptor body.

Where the outer peripheral surface 4 is mirror-polished and further formed with the chloride film 5, as described above, a synergistic effect of the mirror-polishing and the formation of the chloride film 5 more advantageously suppresses the toner adhesion, and more advantageously prevents the contamination of the photoreceptor body.

The shaft 3 may be inserted into and fixed to the through-hole 2 at any time between the end of the cutting of the tubular body and the end of the polishing.

However, the tubular body is preferably secondarily crosslinked and polished with the shaft 3 inserted through the through-hole 2 after the cutting. This prevents warpage and deformation of the semiconductive roller 1 which may otherwise occur due to expansion and contraction of the tubular body during the secondary crosslinking. The outer peripheral surface may be polished, while the tubular body is rotated about the shaft 3. This improves the working efficiency in the polishing, and suppresses deflection of the outer peripheral surface 4.

As previously described, the shaft 3 may be inserted through the through-hole 2 of the tubular body with the intervention of the electrically conductive thermosetting adhesive agent before the secondary crosslinking, or the shaft 3 having an outer diameter greater than the inner diameter of the through-hole 2 may be press-inserted into the through-hole 2.

In the former case, the thermosetting adhesive agent is cured when the tubular body is secondarily crosslinked by the heating in the oven. Thus, the shaft 3 is electrically connected to and mechanically fixed to the semiconductive roller 1.

In the latter case, the electrical connection and the mechanical fixing are achieved simultaneously with the press insertion.

Thereafter, the outer peripheral surface 4 is chlorinated, whereby the chloride film 5 is formed in the outer peripheral surface 4. Thus, the semiconductive roller 1 is completed.

The formation of the chloride film 5 is achieved by chlorinating a part of the electrically conductive rubber composition present in the outer peripheral surface 4 of the semiconductive roller 1. Therefore, the resulting chloride film 5 is free from contamination with foreign matter, an uneven thickness and other problems associated with a conventional film formation method in which a coating film is formed by applying a coating agent, and is highly uniform in thickness and surface geometry.

The inventive semiconductive roller 1 may have a double layer structure which includes an outer layer provided on the side of the outer peripheral surface 4 and an inner layer provided on the side of the shaft 3. Further, the semiconductive roller 1 may have a porous structure.

However, the semiconductive roller 1 preferably has a nonporous single-layer structure for simplification of the structure thereof, for production thereof at higher productivity at lower costs, and for improvement of the durability, the compression set characteristic and other characteristic properties.

Here, the single-layer structure means that the semiconductive roller includes a single layer formed from the electrically conductive rubber composition and the chloride film 5 formed by the chlorination is not counted.

The inventive semiconductive roller 1 can be advantageously used not only as the developing roller but also as a charging roller, a transfer roller, a cleaning roller or the like, for example, in an electrophotographic image forming apparatus such as a laser printer, an electrostatic copying machine, a plain paper facsimile machine or a printer-copier-facsimile multifunction machine.

EXAMPLES

Example 1

(Preparation of Electrically Conductive Rubber Composition)

A rubber component was prepared by blending 30 parts by mass of an EPDM (non-oil-extension type, ESPRENE (registered trade name) 505A available from Sumitomo Chemical Co., Ltd., and having an ethylene content of 50% and a diene content of 9.5%) and 70 parts by mass of an SBR (non-oil-extension type, JSR1502 available from JSR Co., Ltd. and having a styrene content of 23.5%). The proportion of the EPDM was 30 parts by mass based on 100 parts by mass of the overall rubber component.

While 100 parts by mass of the rubber component was simply kneaded by means of a Banbury mixer, 47.5 parts by mass of electrically conductive carbon black (HAF-grade, SEAST 3 available from Tokai Carbon Co., Ltd.) was added to the rubber component, and then the resulting mixture was further kneaded.

While the mixture was continuously kneaded, the following crosslinking component was added to the mixture, which was in turn further kneaded. Thus, an electrically conductive rubber composition was prepared.

TABLE 1

| Ingredients | Parts by mass |
| --- | --- |
| 5% Oil-containing sulfur | 1.58 |
| Peroxide crosslinking agent | 2.00 |
| Accelerating agent M | 1.00 |
| Zinc oxide type-2 | 5.00 |

The ingredients shown in Table 1 are as follows. The amounts (parts by mass) shown in Table 1 are based on 100 parts by mass of the overall rubber component. 5% Oil-containing sulfur: Crosslinking agent (available from Tsurumi Chemical Industry Co., Ltd.) Peroxide crosslinking agent: Dicumyl peroxide (PERCUMYL (registered trade name) D available from NOF Corporation) Accelerating agent M: 2-Mercaptobenzothiazole (thiazole accelerating agent, NOCCELER (registered trade name) M-P available from Ouchi Shinko Chemical Industrial Co., Ltd.)
Zinc oxide type-2: Acceleration assisting agent (available from Mitsui Mining & Smelting Co., Ltd.)

(Production of Semiconductive Roller)

The electrically conductive rubber composition thus prepared was fed into an extruder, and extruded into a cylindrical tubular body having an outer diameter of 22 mm and an inner diameter of 9 to 9.5 mm. Then, the tubular body was fitted around a temporary crosslinking shaft having an outer diameter of 8 mm, and crosslinked in a vulcanization can at 160° C. for 1 hour.

Then, the crosslinked tubular body was removed from the temporary shaft, then fitted around a metal shaft having an outer diameter of 10 mm and an outer peripheral surface to which an electrically conductive thermosetting adhesive agent was applied, and heated to 160° C. in an oven. Thus, the tubular body was bonded to the shaft. In turn, opposite end portions of the tubular body were cut, and the outer peripheral surface of the resulting tubular body was polished by a traverse polishing method by means of a cylindrical polishing machine and then mirror-polished.

Subsequently, the polished outer peripheral surface 4 of the tubular body was rinsed with water, and then brought into contact with chlorine water for chlorination, whereby a chloride film 5 was formed in the outer peripheral surface 4. Thus, the semiconductive roller 1 was produced.

The chlorine water was prepared by adding 2 g of hydrochloric acid (having a concentration of 35%) and 4 g of sodium hypochlorite to 500 g of distilled water. The conditions for the chlorination were a chlorine water temperature of 20° C. and a contact period of 5 minutes.

Example 2

An electrically conductive rubber composition was prepared in substantially the same manner as in Example 1, except that an NBR (lower-acrylonitrile content NBR of non-oil-extension type, JSR (registered trade name) N250SL available from JSR Co., Ltd., and having an acrylonitrile content of 19.5%) was blended instead of the SBR in the same proportion. A semiconductive roller 1 was produced by using the electrically conductive rubber composition thus prepared. The proportion of the EPDM was 30 parts by mass based on 100 parts by mass of the overall rubber component.

Example 3

An electrically conductive rubber composition was prepared in substantially the same manner as in Example 1, except that the proportion of the SBR was 35 parts by mass and an NBR (lower-acrylonitrile content NBR of non-oil-extension type, JSR (registered trade name) N250SL available from JSR Co., Ltd., and having an acrylonitrile content of 19.5%) was additionally blended in a proportion of 35 parts by mass. Then, a developing roller was produced by using the electrically conductive rubber composition thus prepared. The proportion of the EPDM was 30 parts by mass based on 100 parts by mass of the overall rubber component. The mass ratio between the SBR and the NBR was SBR/NBR=50/50.

Example 4

An electrically conductive rubber composition was prepared in substantially the same manner as in Example 1, except that the proportion of the EPDM was 70 parts by mass, and the proportion of the SBR was 30 parts by mass. A semiconductive roller 1 was produced by using the electrically conductive rubber composition thus prepared. The proportion of the EPDM was 70 parts by mass based on 100 parts by mass of the overall rubber component.

Example 5

An electrically conductive rubber composition was prepared in substantially the same manner as in Example 1, except that the proportion of the EPDM was 20 parts by mass, and the proportion of the SBR was 80 parts by mass. A semiconductive roller 1 was produced by using the electrically conductive rubber composition thus prepared. The proportion of the EPDM was 20 parts by mass based on 100 parts by mass of the overall rubber component.

Example 6

An electrically conductive rubber composition was prepared in substantially the same manner as in Example 1, except that the proportion of the EPDM was 80 parts by mass, and the proportion of the SBR was 20 parts by mass. A semiconductive roller 1 was produced by using the electrically conductive rubber composition thus prepared. The proportion of the EPDM was 80 parts by mass based on 100 parts by mass of the overall rubber component.

Example 7

A semiconductive roller 1 was produced in substantially the same manner as in Example 1, except that chlorine water prepared by adding 1 g of hydrochloric acid (having a concentration of 35%) and 2 g of sodium hypochlorite to 500 g of distilled water was used.

Example 8

A semiconductive roller 1 was produced in substantially the same manner as in Example 1, except that chlorine water prepared by adding 20 g of hydrochloric acid (having a concentration of 35%) and 40 g of sodium hypochlorite to 500 g of distilled water was used.

Example 9

A semiconductive roller 1 was produced in substantially the same manner as in Example 1, except that chlorine water prepared by adding 0.5 g of hydrochloric acid (having a concentration of 35%) and 1 g of sodium hypochlorite to 500 g of distilled water was used.

Example 10

A semiconductive roller 1 was produced in substantially the same manner as in Example 1, except that chlorine water prepared by adding 21 g of hydrochloric acid (having a concentration of 35%) and 42 g of sodium hypochlorite to 500 g of distilled water was used.

Comparative Example 1

A semiconductive roller 1 of Comparative Example 1 was produced in substantially the same manner as in Example 1, except that the outer peripheral surface 4 was not chlorinated.

<Measurement of Friction Coefficient μ>

The friction coefficient μ the outer peripheral surface 4 of each of the semiconductive rollers 1 of Examples was measured by the aforementioned method.

<Cracking>

The outer peripheral surface 4 of each of the semiconductive rollers 1 of Examples was visually checked for cracking.

The results are shown in Tables 2 and 3.

TABLE 2

|  | Example 5 | Example 1 | Example 4 | Example 6 | Example 2 | Example 3 |
|---|---|---|---|---|---|---|
| Rubber component (parts by mass) | | | | | | |
| EPDM | 20 | 30 | 70 | 80 | 30 | 30 |
| SBR | 80 | 70 | 30 | 20 | — | 35 |
| NBR | — | — | — | — | 70 | 35 |
| Chlorine water | | | | | | |
| Hydrochloric acid | 2 g | 2 g | 2 g | 2 g | 2 g | 2 g |
| Sodium hypochlorite | 4 g | 4 g | 4 g | 4 g | 4 g | 4 g |
| Evaluation | | | | | | |
| Friction coefficient μ | 0.11 | 0.12 | 0.15 | 0.18 | 0.12 | 0.13 |
| Cracking | Yes | No | No | No | No | No |

TABLE 3

|  | Example 9 | Example 7 | Example 8 | Example 10 | Comparative Example 1 |
|---|---|---|---|---|---|
| Rubber component (parts by mass) | | | | | |
| EPDM | 30 | 30 | 30 | 30 | 30 |
| SBR | 70 | 70 | 70 | 70 | 70 |
| NBR | — | — | — | — | — |
| Chlorine water | | | | | |
| Hydrochloric acid | 0.5 g | 1 g | 20 g | 21 g | — |
| Sodium hypochlorite | 1 g | 2 g | 40 g | 42 g | — |
| Evaluation | | | | | |
| Friction coefficient μ | 0.19 | 0.15 | 0.08 | 0.06 | 1.50 |
| Cracking | No | No | No | Yes | No |

The results for Examples 1 to 10 and Comparative Example 1 in Tables 2 and 3 indicate that, where the chloride film 5 is formed in the outer peripheral surface 4 by the chlorination, the friction coefficient μ of the outer peripheral surface 4 can be reduced as compared with a case in which the chloride film 5 is not formed.

The results for Examples 1 and 4 to 6 indicate that, in the EPDM-containing system in which the EPDM is used for the rubber component, the friction coefficient μ of the outer peripheral surface 4 is reduced as the proportion of the EPDM is reduced, and the proportion of the EPDM is preferably not greater than 70 parts by mass based on 100 parts by mass of the rubber component in order to reduce the friction coefficient μ to 0.15 or less.

If the proportion of the EPDM is excessively small in the EPDM-containing system, the outer peripheral surface 4 is liable to suffer from the cracking. For prevention of the cracking, the proportion of the EPDM is preferably not less than 30 parts by mass based on 100 parts by mass of the rubber component.

The results for Examples 1 and 7 to 10 indicate that, where the chlorine water prepared by the addition of hydrochloric acid and sodium hypochlorite is used, the friction coefficient μ of the outer peripheral surface 4 is reduced as the amounts of the hydrochloric acid and the sodium hypochlorite to be added are increased and, in order to reduce the friction coefficient μ to 0.15 or less, the amounts of the hydrochloric acid and the sodium hypochlorite to be added to 500 g of water are preferably not less than 1 g and not less than 2 g, respectively.

If the amounts of the hydrochloric acid and the sodium hypochlorite to be added are excessively great, the outer peripheral surface 4 is liable to suffer from the cracking. For prevention of the cracking, the amounts of the hydrochloric acid and the sodium hypochlorite to be added to 500 g of water are preferably not greater than 20 g and not greater than 40 g, respectively.

This application corresponds to Japanese Patent Application No. 2014-187914 filed in the Japan Patent Office on Sep. 16, 2014, the disclosure of which is incorporated herein by reference in its entirety.

What is claimed is:

1. A semiconductive roller comprising a tubular body made of a crosslinking product of an electrically conductive rubber composition containing a crosslinkable rubber component, and having a chlorinated outer peripheral surface,
    wherein the outer peripheral surface has a friction coefficient μ of not greater than 0.15, and
    wherein the rubber component includes an ethylene propylene diene rubber in a proportion of not less than 30 parts by mass and not greater than 70 parts by mass based on 100 parts by mass of the overall rubber component.

* * * * *